United States Patent
Hisserich

[11] 3,888,217
[45] June 10, 1975

[54] CAMSHAFT BELT DRIVE FOR VARIABLE VALVE TIMING

[76] Inventor: Charles A. Hisserich, 447 Cabrillo St., Costa Mesa, Calif. 92627

[22] Filed: Sept. 24, 1973

[21] Appl. No.: 400,125

[52] U.S. Cl...... 123/90.31; 74/242.15 R; 123/90.15
[51] Int. Cl.............................................. F01l 1/02
[58] Field of Search..................... 123/90.31, 90.15; 74/242.15 R

[56] References Cited
UNITED STATES PATENTS

| | | | |
|---|---|---|---|
| 1,819,743 | 8/1931 | Duncan | 123/90.15 |
| 1,871,268 | 8/1932 | Hildebrand | 123/90.15 |
| 2,831,359 | 4/1958 | Carle | 123/90.31 |
| 2,838,946 | 6/1958 | Kiekhaefer | 123/90.31 |
| 3,274,840 | 9/1966 | Dunn | 74/242.15 R |
| 3,441,009 | 4/1969 | Rafanelli | 123/90.15 |
| 3,494,336 | 2/1970 | Myers | 123/90.15 |
| 3,496,918 | 2/1970 | Finlay | 123/90.15 |
| 3,683,875 | 8/1972 | Chadwick | 123/90.15 |
| 3,762,381 | 10/1973 | Dave | 123/90.15 |
| 3,768,324 | 10/1973 | Vanderstegen-Drake | 74/242.15 R |

Primary Examiner—Charles J. Myhre
Assistant Examiner—Daniel J. O'Connor
Attorney, Agent, or Firm—Lawrence Fleming

[57] ABSTRACT

A timing belt drive system for driving the camshafts in internal-combustion engines which provides control of the valve timing and overlap. Slack is provided in the timing belt, and is taken up by movable idler pulleys. The positions of the centers of the idlers are displaceable under external control, as in response to engine speed and intake vacuum. Displacement of the idlers thus operates to change the angular relation between the drive pulley on the crankshaft and the driven pulley on the camshaft, i.e., the valve timing. In dohc engines having separate camshafts for the intake and exhaust valves, the valve "overlap" is similarly controllable. The system provides higher efficiency over a wider range of speeds, and reduces the emission of pollutants.

2 Claims, 6 Drawing Figures 3,888,217

CAMSHAFT BELT DRIVE FOR VARIABLE VALVE TIMING

REFERENCE TO DISCLOSURE DOCUMENT

This invention is disclosed in my Disclosure Document No. 6690 of Sept. 17, 1971.

BACKGROUND

It is now common practice to manufacture internal combustion engines engines of the overhead camshaft type with the camshaft driven from the crankshaft via a toothed belt or timing belt. The belt may also drive the distributor or other engine accessories, but that does not concern the present invention.

Ignition timing is commonly controlled automatically by speed-responsive and vacuum-responsive means. Valve timing is, however, usually fixed. It is known that engine power output, efficiency, and pollutant emission are strongly affected by valve timing, and that the best timing varies with speed and load. Racing engines, for example, use valve timing that is optimized for maximum output at high speed, and hence run very poorly at low speeds.

For general automotive use, the fixed valve timing in a conventional engine is a compromise between the requirements of freeway and local driving.

BRIEF SUMMARY

In an engine having a timing belt connecting toothed pulleys on the crankshaft and camshaft (or camshafts), the belt is made extra-long, and the slack is taken up by idler pulleys. The pivot points of the idlers are displaceable. In a sohc (single overhead camshaft) engine, two idlers may be provided, one pressing against each "side" of the timing belt as it extends upward from the crankshaft pulley to the driven pulley on the camshaft. Both idlers may be mounted on a common yoke. When the yoke is displaced sideways, one "side" portion of the belt becomes in effect longer, and the other side shorter, thus varying the angular relation between the driving and driven pulleys, i.e., the valve timing. The yoke may be displaced by known mechanisms which are responsive to engine speed or/and the vacuum in the intake manifold.

In a double-overhead-camshaft engine (dohc), each camshaft may be driven by a separate timing belt, and idlers on displaceable yokes provided for each. Thus the relative timing between the intake valves and the exhaust valves may be varied, to provide "overlap" at high speeds and also to eliminate emission of unburned fuel at low speeds.

In another form of the invention adapted to another type of dohc engine, a single timing belt may be used, with two independently displaceable idlers.

DETAILED DESCRIPTION

Figure 1:
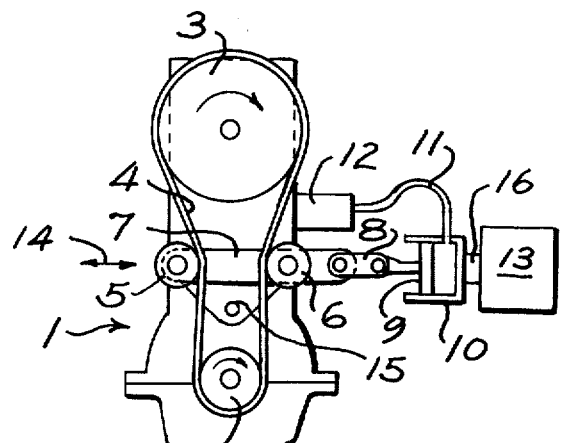
FIG. 1 is a diagrammatic front view of a single-overhead-camshaft internal combustion engine having a variable-timing camshaft belt drive according to the invention.

In FIG. 1, the cylinder block of an internal combustion engine is indicated at 1, and a timing belt pulley on the front end of the crankshaft at 2. A driven timing belt pulley affixed to the end of the overhead camshaft is indicated at 3. Pulley 3 has, conventionally, twice the number of teeth of pulley 2. These pulleys are connected by a toothed belt or timing belt 4, which may be of the common rubber type.

FIGS. 1, 2, 4, 5, and 6 omit showing the teeth for simplicity of illustration. It will be understood that the driving and driven pulleys, and the belts, will be suitably toothed.

Figure 3:
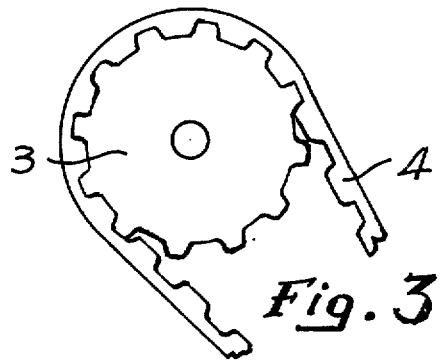
FIG. 3 is a diagrammatic view of a toothed pulley and a portion of a timing belt of the general type used in the other Figures.

FIG. 3 shows a toothed pulley 3 and a portion of a toothed belt 4 of the type employed in the other Figures.

Figure 2:
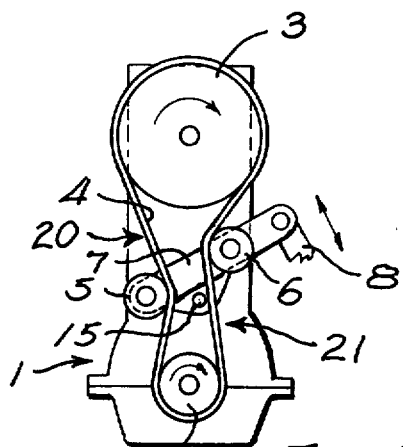
FIG. 2 is a partial similar view showing the valve timing control means in a different position.

Between the crankshaft pulley 2, FIGS. 1 and 2, and the camshaft pulley 3, there is provided a pair of idler pulleys 5, 6 mounted on a yoke 7. This yoke is made movable or displaceable in a generally horizontal direction as indicated by arrow 14, FIG. 1, and may be pivoted for such displacement as at 15, FIGS. 1 and 2. In FIG. 2, the yoke 7 is shown displaced to a position more to the left than in FIG. 1; and hence the lefthand portion or "side" 20 of belt 4 is shorter relative to the right-hand portion or "side" 21. Thus, when the yoke 7 is in the FIG. 2 position, the angular relation of camshaft pulley 3 to crankshaft pulley 2 is advanced as compared to the angular relation or timing in FIG. 1.

The valve timing, via the above means, may be controlled automatically as a function of engine speed and intake manifold vacuum by means indicated at 10, 13 in FIG. 1, which operate to displace the yoke 7 via a link 8. Element 10 is indicated as a cylinder having a movable piston 9, the interior of the cylinder being exposed to the vacuum in intake manifold 12 via a vacuum line 11.

An additional control means, indicated by a box 13, FIG. 1, may operate to move a rod or other link 16 to displace the vacuum element 10. The control means 13 may be a suitable centrifugal device responsive to engine speed, or a combination of such a device and a vacuum servo or other suitable servo means. The case or frame of means 13 being assumed stationary, its mechanical output via rod 16, and the output of element 10, are in series. Elements 9, 10 may be replaced by a diaphragm assembly of known type.

The optimum valve timing for various combinations of engine speed and intake vacuum may be found by known methods, and elements 10, 13, etc. then designed on known engineering principles.

Referring to FIG. 3, it is understood that the known type of toothed pulley 3 and timing belt 4 there shown would be employed to connect the crankshaft and camshaft(s) in all the other Figures.

Figure 4:
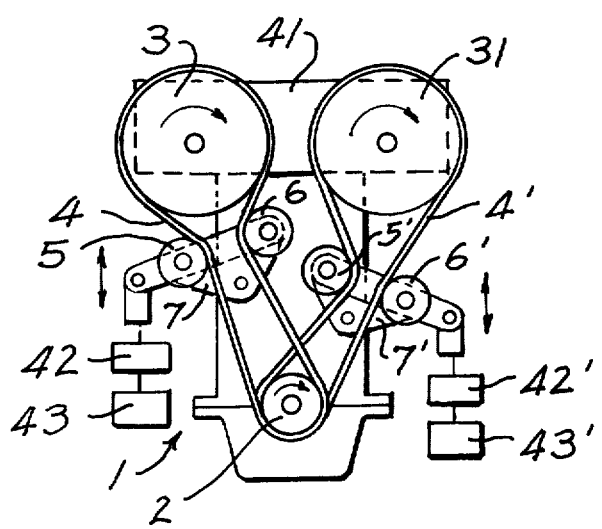
FIG. 4 is a diagrammatic front view of a double-overhead-camshaft engine with a variable-timing drive to each camshaft.
Figure 5:
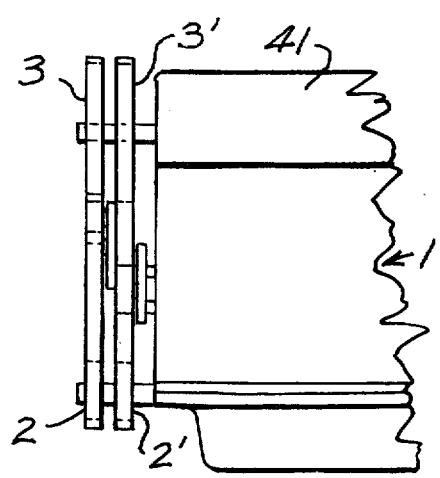
FIG. 5 is a partial diagrammatic side view of FIG. 4.

FIG. 4 shows a double-overhead-camshaft (dohc) engine having cylinder block 1 and dohc cylinder head 41. On the head 41 are two camshaft driving pulleys 3, 3', one driving a camshaft which actuates all the intake valves, the other driving a separate camshaft for the exhaust valves. Pulley 3 is driven from a pulley 2 on the crankshaft, and pulley 3' from another pulley 2'. See FIG. 5 for a partial side view; the pulleys are staggered to prevent interference. An idler yoke 7 with two idler pulleys 5, 6 contacts belt 4 to vary the valve timing to pulley 3, and another yoke 7' with idlers 5', 6' works similarly on belt 4' which drives pulley 3'. The operation of the idler yokes is similar to that in FIGS. 1 and 2.

In FIG. 4, the idler yokes may be controlled separately by vacuum-responsive and speed-responsive means 42, 43 and 42', 43', each operating in a manner similar to the control means 10, 13 of FIG. 1.

All the idler pulleys may be smooth, without teeth, since they contact the outside surfaces of the belts.

The system of FIG. 4 provides optimum engine operation over a wider range of speed and load than the sohc system of FIG. 1 and 2, because it additionally provides for control of the relation between the intake and exhaust valve timings as well as for control of the timing of both sets of valves as a whold, with respect to the crankshaft. At high speeds, for example, the periods when intake valves and exhaust valves are open may desirably overlap; but at low speeds they should not, in the interest of low emission of unburned fuel mixture. When an engine with valve timing overlap, a common type, is run at low speed, unburned fuel goes out through the exhaust system.

Figure 6:
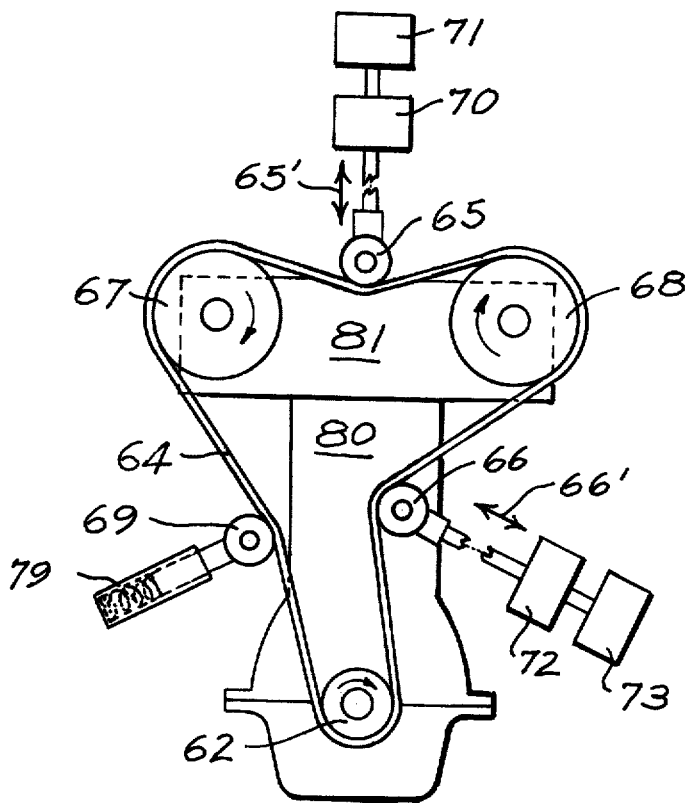
FIG. 6 shows a modified form of FIG. 4.

FIG. 6 shows a modification of the invention applied to a dohc engine of a type such as is used in the Fiat Model 124 automobile. The view is a simplified diagrammatic view from the front, similar to that of FIG. 4. The engine block is indicated at 80 and the dohc cylinder head at 81. The camshaft drive pulleys are indicated at 67, 68, one for all the intake valves and the other for all the exhaust valves. Both are driven by a single timing belt 64 from a drive pulley 62 on the crankshaft.

In FIG. 6, two independently-displaceable idler pulleys 65, 66 are shown for controlling the valve timing. Movement of the center of pulley 65 in the direction of the arrow 65' will, as is evident from the Figure, change the angular relation between the two pulleys 67 and 68 (referred to a system of rotating coorinates) and thus change the degree of overlap or "underlap" between the open times of the intake and exhaust valves. Displacement of the center of pulley 66 along the direction of arrow 66' will change the angular relation or timing of both camshaft pulleys 67, 68 as a group, with respect to the crankshaft.

Pulley 69, FIG. 6, is an idler pressed against the belt 64 by suitable spring means 79, and serves to keep belt 64 taut as idlers 64 and 66 are displaced.

In FIG. 6, suitable vacuum-responsive and speed-responsive devices 70, 71 and 72, 73 are indicated for causing the displacement of the idlers 65 and 66. These devices may operate in the same manner as their counterparts 10 and 13 in FIG. 1. The FIG. 6 modification is relatively simple and cheap to manufacture.

In devices of the instant type, it will be understood that the belts 4 or 65 are toothed timing belts of the usual commercial type which do not stretch appreciably. Hence the displacement of idler pulleys such as 5, 6 or 66, 69, must always have the effect of lengthening the free portion of the belt on one side between the main pulleys, and shortening the corresponding free portion of the belt on the opposite side. Thus in FIG. 1 the right-hand free portion of belt 4, adjacent idler 6, is about the same length as the left-hand free portion which extends adjacent idler 5. In FIG. 2, however, the leftward displacement of yoke 7 has changed the relative lengths of the two free portions, producing a relative angular displacement of the main pulleys 2 and 3.

I claim:

1. In an internal combustion engine having a crankshaft and a camshaft, toothed pulleys on each said shaft and a timing belt having internal teeth connecting said pulleys and having excess length;

a pair of idler pulleys bearing against intermediate free portions of said belt to take up said excess length;

a displaceable yoke carrying said idler pulleys; and means to displace said yoke to vary the angular relation between said toothed pulleys and thereby vary the valve timimg of said engine, said means comprising a vacuum-responsive element and a speed-responsive element adapted to produce linear displacements and both connected mechanically in series to said yoke to thereby displace said yoke as a function of the sum of their individual displacements, whereby said valve timing is varied as a function of both speed and of intake manifold vacuum.

2. Apparatus as in claim 1, wherein said elements are connected mechanically in series, said vacuum-responsive element being adapted to vary the distance between the output member of said speed-responsive element and the output member of said vacuum-responsive element, and being adapted to be displaced bodily by said output member of said speed-responsive element.

* * * * *